(12) United States Patent
Amaya et al.

(10) Patent No.: US 9,623,512 B2
(45) Date of Patent: Apr. 18, 2017

(54) METAL POWDER PROCESSING EQUIPMENT

(71) Applicant: Matsuura Machinery Corporation, Fukui, Fukui (JP)

(72) Inventors: Koichi Amaya, Fukui (JP); Toshihiko Katoh, Fukui (JP); Hideto Matsubara, Fukui (JP); Mitsuyoshi Yoshida, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 387 days.

(21) Appl. No.: 14/477,360

(22) Filed: Sep. 4, 2014

(65) Prior Publication Data
US 2015/0283646 A1 Oct. 8, 2015

(30) Foreign Application Priority Data
Apr. 4, 2014 (JP) .................................. 2014-077712

(51) Int. Cl.
*B23K 15/00* (2006.01)
*B22F 3/10* (2006.01)
(Continued)

(52) U.S. Cl.
CPC ........ *B23K 15/0086* (2013.01); *B22F 3/1017* (2013.01); *B22F 3/1028* (2013.01);
(Continued)

(58) Field of Classification Search
CPC .... B22F 1/0085; B22F 3/1017; B22F 3/1028; B22F 2203/11; B23K 15/0086; B33Y 30/00
See application file for complete search history.

(56) References Cited

U.S. PATENT DOCUMENTS 5,753,274 A * 5/1998 Wilkening ............. B23K 26/34
264/255
8,475,152 B2 * 7/2013 Amaya ................... B22F 3/105
425/217
(Continued)

FOREIGN PATENT DOCUMENTS

JP 2001-234204 A 8/2001
JP 2001-234205 A 8/2001
(Continued)

*Primary Examiner* — Ryan Reis
(74) *Attorney, Agent, or Firm* — Richard M. Goldberg

(57) ABSTRACT

In metal powder processing equipment where metal powder is sequentially laminated on a table of a chamber and laser beam melting or electron beam melting is performed or cutting and shaping are performed by a rotating tool subsequent to melting, a first temperature adjusting unit is placed at a lower bottom portion of the table and a second temperature adjusting unit is disposed in contact with and around the outer wall of the chamber and both units are simultaneously heated or cooled; a room partially enclosing a metal powder reserve tank and a metal powder supply pipe is provided with a third temperature adjusting unit, the temperature of which is set to average temperature of the second temperature adjusting unit before the second one actuates, so that deterioration of dimensional precision in processing and deterioration of metal powder quality can be prevented by keeping heating temperature constant.

7 Claims, 2 Drawing Sheets

(51) Int. Cl.
*B22F 3/105* (2006.01)
*B33Y 30/00* (2015.01)
*B29C 67/00* (2017.01)

(52) U.S. Cl.
CPC .... *B22F 3/1055* (2013.01); *B22F 2003/1056* (2013.01); *B29C 67/0077* (2013.01); *B33Y 30/00* (2014.12); *Y02P 10/295* (2015.11)

(56) References Cited

U.S. PATENT DOCUMENTS

| | | | |
|---|---|---|---|
| 8,525,071 B2* | 9/2013 | Leuterer | B22F 3/003 219/121.65 |
| 8,994,592 B2* | 3/2015 | Scott | B22F 3/1055 343/700 MS |
| 2008/0190905 A1* | 8/2008 | Heinlein | B29C 67/0077 219/121.73 |

FOREIGN PATENT DOCUMENTS

| | | |
|---|---|---|
| JP | 2009-220576 A | 10/2009 |
| JP | 2013-542867 A | 11/2013 |
| JP | 2014-028996 A | 2/2014 |

* cited by examiner

METAL POWDER PROCESSING EQUIPMENT

TECHNICAL FIELD

The present invention relates to metal powder processing equipment in which metal powder is sequentially laminated on a table inside a chamber and laser beam melting or electron beam melting is performed, or the metal powder processing equipment in which cutting and shaping are performed by a rotating tool subsequent to the melting.

BACKGROUND OF THE INVENTION

In metal powder processing equipment, metal powder disposed on a table which moves vertically is heated by a heater placed at a lower bottom portion of the table.

However, as the metal powder is sequentially laminated while laser beam melting or electron beam melting, and cutting by a rotating tool are performed, a distance from the table becomes large. As a result, it is unavoidable that heating temperature transmitted from the heater at the lower bottom portion of the table sequentially lowers.

Because of such a temperature change, density of the metal powder slightly changes, and dimensional precision cannot avoid being affected by this temperature change.

On the other hand, in the case of processing the metal powder in a high-humidity environment, oxidation of the metal powder and deterioration of fluidity may occur, and cooling is needed to be executed inside the chamber.

However, in a prior art, no technical consideration is particularly given to temperature adjustment including cooling in the chamber.

Patent Document 1 discloses a configuration in which heat control for metal powder inside a container is performed, but does not disclose any configuration of keeping temperature of the metal powder inside the container to be constant as much as possible.

Patent Document 2 discloses a configuration in which temperature of a die is constantly controlled within a predetermined temperature range even when die molding is repeatedly performed, but does not disclose any concrete configuration for temperature adjustment, and still more does not suggest any temperature control that can be adopted in the metal powder processing equipment.

Thus, the prior arts neither disclose nor suggest a configuration for appropriately setting the temperature in the metal powder processing equipment.

PRIOR ART DOCUMENTS

Patent Document

Patent Document 1: JP2001-234204A
Patent Document 2: JP2001-234205A

SUMMARY OF THE INVENTION

Problems to be Solved by the Invention

The present invention is directed to preventing deterioration of dimensional precision in processing and deterioration of quality, such as oxidation caused by humidity and deterioration of fluidity, by keeping constant temperature for the metal powder sequentially laminated inside the metal powder processing equipment as much as possible.

To solve the above-mentioned problems, the present invention comprises following basic configurations:

a basic configuration (1), in metal powder processing equipment where metal powder is sequentially laminated on a table inside a chamber and laser beam melting or electron beam melting is performed, or in the metal powder processing equipment where cutting and shaping are performed by a rotating tool subsequent to the melting, a temperature adjusting unit is placed at a lower bottom portion of the table and also a temperature adjusting unit to adjust temperature at all outer wall of the chamber is disposed with the state of contacting to said outer wall around the outside of the chamber, and both of the temperature adjusting units can be simultaneously heated or cooled; and a basic configuration (2), in the metal powder processing equipment having the basic configuration (1), a room configured to enclose an area including a metal powder reserve tank and a metal powder supply pipe except for a protruded portion supplying the metal powder to a metal powder supply unit causing the metal powder to fall into the chamber is provided, and a temperature adjusting unit is disposed inside the room, where temperature of the temperature adjusting unit is set equal to average temperature of the temperature adjusting unit to adjust the temperature at the outer wall of the chamber before or at the same time when the temperature adjusting unit to adjust temperature at the outer wall of the chamber actuates.

A metal powder processing equipment for use with a chamber having a table therein, in which metal powder is sequentially laminated on the table inside the chamber and laser beam melting or electron beam melting is performed, or cutting and shaping are performed by a rotating tool subsequent to the melting, comprising:

a first temperature adjusting unit adapted to be placed at a lower bottom portion of the table; and a second temperature adjusting unit adapted to adjust temperature at all outer walls of the chamber and adapted to be disposed in contact with said outer walls around an outside of the chamber, wherein both the first and the second temperature adjusting units are adapted to be simultaneously heated or cooled, wherein the chamber is disposed out of a room, and wherein the room is configured to enclose an area including a metal powder reserve tank and a metal powder supply pipe except for a protruded portion thereof for supplying metal powder to a metal powder supply unit so as to cause the metal powder to fall into the chamber, and further comprising a third temperature adjusting unit adapted to be disposed inside the room for adjusting a temperature of metal powder in the metal powder reserve tank and a temperature of metal powder in the metal powder supply pipe, with a temperature of the third temperature adjusting unit set equal to an average temperature of the second temperature adjusting unit to adjust the temperature at the outer walls of the chamber one of:

before and at the same time when the second temperature adjusting unit adjusts the temperature at the outer walls of the chamber.

In the case where melting of metal powder or cutting and shaping performed by a rotating tool after a process of melting is not executed inside the chamber, the temperature and humidity inside the room is adapted to be adjusted to be set lower than at least one of a respective normal temperature and humidity inside the room.

There is a metal powder supply unit reciprocating above the chamber and a fourth temperature adjusting unit adapted to be positioned between an inner wall portion and a peripheral outer wall portion of the metal powder supply unit reciprocating above the chamber and is configured to adjust a temperature at the inner wall portion where metal powder falls and passes, in which the temperature can be set equal to a temperature at a lower end portion of the second temperature adjusting unit to adjust temperature at the outer walls of the chamber.

A hollow is formed between the inner wall portion and the outer wall portion of the metal powder supply unit, and the fourth temperature adjusting unit includes one of:

an electric heating wire wound around the inner wall portion of the metal powder supply unit, boiling water or vapor one of supplied and discharged in the case of heating, and cooling water or cooling air one of supplied and discharged in the case of cooling.

Further, a temperature of the first temperature adjusting unit at a lower bottom portion of the table at an end portion of an inner wall portion side of the chamber is adapted to be controlled to be equal to a temperature of the second temperature adjusting unit to adjust temperature at an outer wall of the chamber that is at a same height as the first temperature adjusting unit placed at a lower bottom portion of the table.

In the case of heating the metal powder, the temperature at the second temperature adjusting unit at each position at the outer walls of the chamber is set higher as the position rises from the table for reducing a degree of influence by the first temperature adjusting unit, and in the case of cooling the metal powder, the temperature at the second temperature adjusting unit at each position of the outer walls of the chamber is set lower as the position rises from the table for reducing a degree of influence by the first temperature adjusting unit.

In the case of heating the metal powder, the temperature of the first temperature adjusting unit at each position of the table is set higher as the position is further inward from a side of an inner wall portion of the chamber for reducing a degree of influence by the second temperature adjusting unit, and in the case of cooling the metal powder, the temperature of the first temperature adjusting unit at each position of the table is set lower as the position is further inward from the side of the inner wall portion of the chamber for reducing a degree of influence by the second temperature adjusting unit.

DETAILED DESCRIPTION

Figure 1:
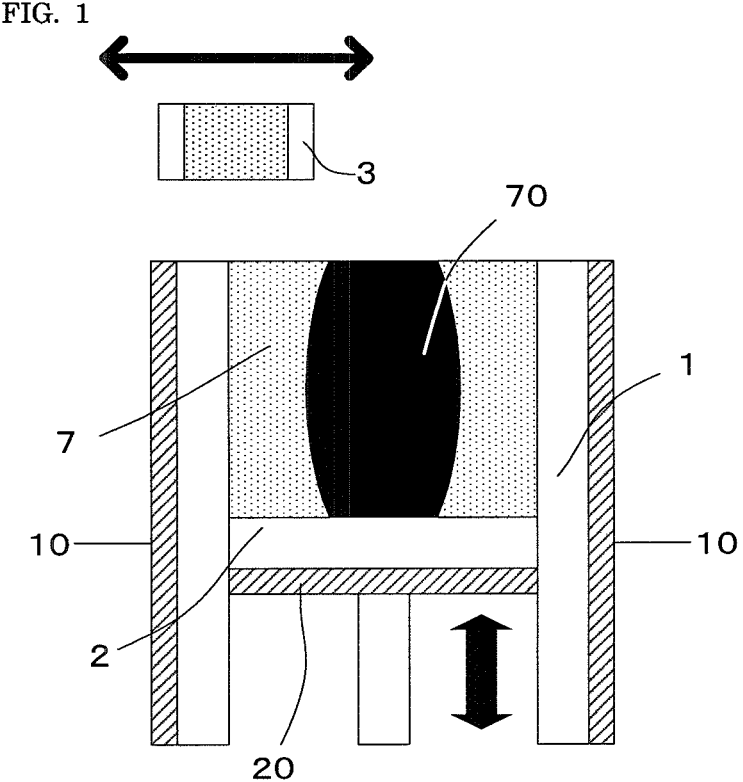
FIG. 1 is a cross-sectional view illustrating a basic configuration of the present invention.

As sketching in FIG. 1, according to the basic configuration (1), in metal powder processing equipment where metal powder 7 is sequentially laminated on the table 2 inside a chamber 1 and laser beam melting or electron beam melting is performed, or in the metal powder processing equipment where shaping by cutting is performed by a rotating tool subsequent to the melting, a temperature adjusting unit 20 is disposed at a lower bottom portion of a table 2 instead of a heater in the prior art.

A temperature adjusting unit 10 that adjusts temperature at all outer walls of the chamber 1 is also disposed with the state of contacting said outer wall around the outside of the chamber 1, and both of the temperature adjusting units 10 and 20 can be simultaneously heated or cooled.

Since the temperature adjusting units 10 and 20 thus configured are provided, temperature change can be reduced inside the chamber 1 at the time of both heating and cooling, compared to the cases in the prior arts even when the metal powder 7 is sequentially laminated inside the chamber 1 along with the laser beam melting or electron beam melting, and further with cutting by the tool.

More specifically, compared to the technologies in the prior arts, decrease of heating temperature can be more suppressed by heating the outer wall of chamber 1 from the periphery thereof in the case of heating, and also in a cooling step, cooling can be executed keeping the temperature inside the chamber 1 substantially constant by the temperature set at the temperature adjusting units 10 and 20.

Temperature adjustment by the temperature adjusting unit 20 at the lower bottom portion of the table 2 and the temperature adjusting unit 10 provided around the outer wall of the chamber 1 may be implemented by disposing an electric heating wire, or supplying and discharging boiling water or heated vapor in the case of heating, and supplying and discharging cooling water, cooling air or liquid ammonium in the case of cooling. As a result, the above-mentioned effects can be achieved.

Figure 2:
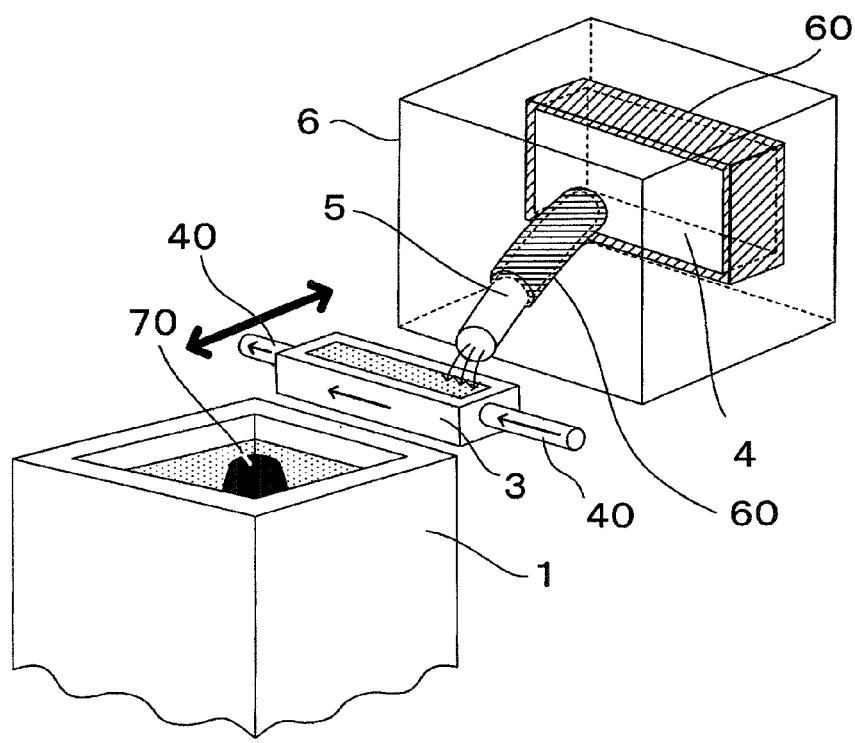
FIG. 2 is a view with the state of contacting to said outer wall illustrating a configuration corresponding to the basic configuration (2), in which a metal powder supply device including a metal powder supply unit, a metal powder reserve tank, a metal powder supply pipe, and a metal powder processing equipment of the present invention are disposed.

As is disclosed in FIG. 2, according to the basic configuration (2), a room 6 is provided, and the room encloses an area including a metal powder reserve tank 4 and a metal powder supply pipe 5 except for a protruded portion supplying the metal powder 7 to the metal powder supply unit 3 causing the metal powder 7 fall into the chamber 1, and is provided with a temperature adjusting unit 60 inside thereof. Based on this configuration, the temperature of the temperature adjusting unit 60 can be set equal to average temperature of the above-mentioned temperature adjusting unit 10 before or at the same time when the temperature adjusting unit 10 is actuated for the outer wall of the chamber 1.

Note that, according to the present invention, the basic configuration (2) depends on the basic configuration (1), but in order to stably preserve the metal powder 7 inside the room, the temperature adjusting unit inside the room can be fundamentally configured independently from the basic configuration (1).

When the metal powder 7 is supplied from the metal powder supply pipe 5 to the metal powder supply unit 3, temperature adjustment described later is not constantly necessary in the metal powder supply unit 3.

In the basic configuration (2), an embodiment may be adopted in which when melting or casting subsequent to the melting is not executed inside the chamber 1, the temperature inside the room can be set lower than normal temperature, and/or humidity inside the room can be adjusted.

By adopting the embodiment thus configured, oxidation of the metal powder 7 can be surely prevented and the metal powder can be preserved without changing the quality during a normal period when melting or processing subsequent to the melting are not executed inside the chamber 1.

According to the basic configurations (1) and (2), in most cases, an embodiment is adopted in which temperature of the temperature adjusting unit 20 placed at the lower bottom portion of the table 2 at an end portion of an inner wall side of the chamber 1 can be controlled to be equal to temperature of the temperature adjusting unit 10 to adjust temperature at the outer wall of the chamber 1 that is at the same height as the temperature adjusting unit 20 placed at the lower bottom portion of the table 2. The reason is that, in the case of obtaining substantially uniform temperature inside the chamber 1, it is preferable to achieve a state in which the temperature at a lower end portion of the inner wall of the chamber 1 be substantially equal to the temperature at the end portion of the inner wall side of the table 2.

EMBODIMENT

Embodiments will be described in the following.

Embodiment 1

Even when temperature of the temperature adjusting unit 60 in a room 6 is preliminarily set equal to an average temperature at an outer wall of a chamber 1, as is described on the basic configuration (2), the temperature inside the room does not constantly and accurately become equal to the temperature at the outer wall of the chamber 1 while melting is actually performed.

Figure 3:
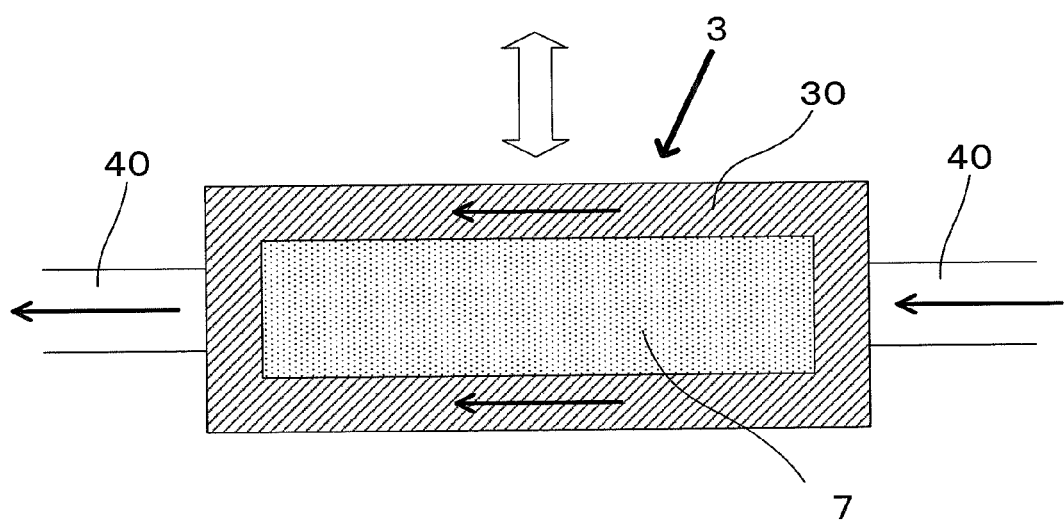
FIG. 3 is a top side view illustrating a state in which boiling water or vapor, and cooling water or cooling air are supplied to and discharged from the metal powder supply unit having a hollow.

To handle such a situation, in example 1 which is already provided with both of the basic configurations (1) and (2), a metal powder supply unit 3 reciprocating above the chamber 1 includes a temperature adjusting unit 30 between an inner wall portion and a peripheral outer wall portion as illustrated in FIGS. 2 and 3 and this temperature adjusting unit 30 adjusts temperature at an inner wall portion where metal powder 7 falls and passes. Additionally, in the temperature adjusting unit, the temperature can be set equal to the temperature at a lower end portion of the temperature adjusting unit 30 to adjust temperature at the outer wall of the chamber 1.

Thus, in the case of setting the temperature in the metal powder supply unit 3 equal to temperature at the lower end portion of the temperature adjusting unit 10 provided for the outer wall of the chamber 1, a temperature difference between a table 2 side and an upper side of laminated layers due to accumulation of the laminated layers along with melting and processing can be further reduced.

As is disclosed in FIG. 3, a hollow is formed between the inner wall and the outer wall of the metal powder supply unit 3, and therefore, the above-mentioned temperature setting can be achieved by winding an electric heating wire around the inner wall, or supplying and discharging boiling water or vapor in the case of heating, and supplying and discharging cooling water or cooling air in the case of cooling.

Embodiment 2

As laminated layers are sequentially accumulated, it is impossible to prevent influence of heating and cooling at a lower bottom portion of a table 2 from sequential decrease.

To handle such decrease of the influence, in embodiment 2 already provided with basic configurations (1) and (2), a configuration is adopted in which, in the case of heating metal powder 7, temperature at a temperature adjusting unit 10 to adjust temperature at an outer wall of a chamber 1 can be set to higher temperature as a position of the temperature adjusting unit to adjust temperature at the outer wall of the chamber 1 approaches to an upper side, and in the case of cooling the metal powder 7, the temperature at the temperature adjusting unit 10 to adjust temperature at the outer wall of the chamber 1 can be set to lower temperature as the position of the temperature adjusting unit 10 to adjust temperature at the outer wall of the chamber 1 approaches to the upper side. As a result, a degree of such decrease of the influence can be reduced.

The above-mentioned configuration may be implemented in a following manner: in the case of heating, heat generation per unit area is increased by providing a larger amount of an electric heating wire wounded around an upper side of an outer wall of the chamber 1, or boiling water or heated vapor to be supplied to the temperature adjusting unit 10 is supplied from an upper side and discharged from a lower side in order that the temperature adjusting unit 10 at the higher temperature is set higher as the position approaches to the upper side. Further, a passing quantity and temperature of the boiling water or the heated vapor are suitably selected, thereby setting appropriate temperature gradient.

In the same manner, in the case of cooling, cooling water, cooling air, or liquid ammonium is supplied from the upper side and discharged from the lower side such that the lower temperature can be set as the position approaches to the upper side. Further, the temperature and the passing quantity of the cooling water or the cooling air are suitably selected, thereby setting appropriate temperature gradient.

As the position approaches to an inner side from the outer wall of chamber 1, it is impossible to prevent influence of the temperature adjustment at the outer wall side from sequential decrease.

To handle such decrease of the influence, according to the second embodiment already provided with the basic configurations (1) and (2), a configuration is adopted in which, in the case of heating the metal powder 7, temperature of a temperature adjusting unit 20 placed at a lower bottom portion of a table 2 can be set higher as a position of the temperature adjusting unit 20 placed at the lower bottom portion of the table 2 approaches to a center position from an inner wall portion side of the chamber 1, and in the case of cooling the metal powder 7, the temperature of the temperature adjusting unit 20 placed at a lower bottom portion of a table 2 can be set lower as the position of the temperature adjusting unit 20 placed at the lower bottom portion of the table 2 approaches to the center position from the inner wall portion side of the chamber 1. As a result, a degree of such decrease of the influence can be reduced.

The above-mentioned configuration may be implemented in a following manner: in the case of heating, heat generation per unit area is increased by disposing a larger amount of the electric heating wire as the position approaches to the center of the bottom portion, or the boiling water or the heated vapor to be supplied to the temperature adjusting unit 20 is supplied from the center position and discharged from an inner end of the chamber 1 in order to set higher temperature as the position approaches to the center. Further, the temperature and the passing quantity of the boiling water or the heated vapor are suitably selected, thereby setting the appropriate temperature gradient.

In the same manner, in the case of cooling, the cooling water or the cooling air is supplied to the temperature adjusting unit 20 from the center position thereof and discharged from the inner end of the chamber 1, and further the temperature and the passing quantity of the cooling water or the cooling air are suitably selected, thereby setting the appropriate temperature gradient.

APPLICABILITY OF THE INVENTION

The present invention is applicable to any field of the metal powder processing equipment where melting and cutting are performed for the metal powder, and remarkable technical effects can be obtained by application of the present invention.

EXPLANATION OF REFERENCES 1 chamber
10 temperature adjusting unit for chamber
2 table
20 temperature adjusting unit at lower bottom portion of table
3 metal powder supply unit
30 temperature adjusting unit for inner wall of metal powder supply unit
40 pipe for supply and discharge
4 metal powder reserve tank
5 metal powder supply pipe
6 a room enclosing the area which provides the metal powder 7
60 temperature adjusting room in a room 6
7 metal powder
70 melting and cutting region in metal powder

What is claimed is:

1. A metal powder processing equipment for use with a chamber having a table therein, in which metal powder is sequentially laminated on the table inside the chamber and laser beam melting or electron beam melting is performed, or cutting and shaping are performed by a rotating tool subsequent to the melting, comprising:
    a first temperature adjusting unit adapted to be placed at a lower bottom portion of the table; and
    a second temperature adjusting unit adapted to adjust temperature at all outer walls of the chamber and adapted to be disposed in contact with said outer walls around an outside of the chamber,
    wherein both the first and the second temperature adjusting units are adapted to be simultaneously heated or cooled,
    wherein the chamber is disposed out of a room, and
    wherein the room is configured to enclose an area including a metal powder reserve tank and a metal powder supply pipe except for a protruded portion thereof for supplying metal powder to a metal powder supply unit so as to cause the metal powder to fall into the chamber, and
    further comprising a third temperature adjusting unit adapted to be disposed inside the room for adjusting a temperature of metal powder in the metal powder reserve tank and a temperature of metal powder in the metal powder supply pipe, with a temperature of the third temperature adjusting unit set equal to an average temperature of the second temperature adjusting unit to adjust the temperature at the outer walls of the chamber one of:
        before and
        at the same time
    when the second temperature adjusting unit adjusts the temperature at the outer walls of the chamber.

2. The metal powder processing equipment according to claim 1, wherein in the case where melting of metal powder or cutting and shaping performed by a rotating tool after a process of melting is not executed inside the chamber, the temperature and humidity inside the room is adapted to be adjusted to be set lower than at least one of a respective normal temperature and humidity inside the room.

3. The metal powder processing equipment according to claim 2 wherein there is a metal powder supply unit reciprocating above the chamber and
    further comprising a fourth temperature adjusting unit adapted to be positioned between an inner wall portion and a peripheral outer wall portion of the metal powder supply unit reciprocating above the chamber and is configured to adjust a temperature at the inner wall portion where metal powder falls and passes, in which the temperature can be set equal to a temperature at a lower end portion of the second temperature adjusting unit to adjust temperature at the outer walls of the chamber.

4. The metal powder processing equipment according to claim 3, wherein a hollow is formed between the inner wall portion and the outer wall portion of the metal powder supply unit, and the fourth temperature adjusting unit includes one of:
    an electric heating wire wound around the inner wall portion of the metal powder supply unit,
    boiling water or vapor one of supplied and discharged in the case of heating, and
    cooling water or cooling air one of supplied and discharged in the case of cooling.

5. The metal powder processing equipment according to claim 1, wherein a temperature of the first temperature adjusting unit at a lower bottom portion of the table at an end portion of an inner wall portion side of the chamber is adapted to be controlled to be equal to a temperature of the second temperature adjusting unit to adjust temperature at an outer wall of the chamber that is at a same height as the first temperature adjusting unit placed at a lower bottom portion of the table.

6. The metal powder processing equipment according to claim 1, wherein in the case of heating the metal powder, the temperature at the second temperature adjusting unit at each position at the outer walls of the chamber is set higher as the position rises from the table for reducing a degree of influence by the first temperature adjusting unit, and in the case of cooling the metal powder, the temperature at the second temperature adjusting unit at each position of the outer walls of the chamber is set lower as the position rises from the table for reducing a degree of influence by the first temperature adjusting unit.

7. The metal powder processing equipment according to claim 1, wherein in the case of heating the metal powder, the temperature of the first temperature adjusting unit at each position of the table is set higher as the position is further inward from a side of an inner wall portion of the chamber for reducing a degree of influence by the second temperature adjusting unit, and in the case of cooling the metal powder, the temperature of the first temperature adjusting unit at each position of the table is set lower as the position is further inward from the side of the inner wall portion of the chamber for reducing a degree of influence by the second temperature adjusting unit.

* * * * *